(12) United States Patent
Katz et al.

(10) Patent No.: US 7,216,359 B2
(45) Date of Patent: May 8, 2007

(54) SECURE COMMUNICATION OVERLAY USING IP ADDRESS HOPPING

(75) Inventors: Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 10/324,440

(22) Filed: Dec. 19, 2002

(65) Prior Publication Data

US 2004/0123143 A1    Jun. 24, 2004

(51) Int. Cl.
G06F 7/04 (2006.01)
G06F 7/58 (2006.01)
G06F 15/16 (2006.01)
H04L 9/32 (2006.01)
G06F 15/173 (2006.01)

(52) U.S. Cl. .......................................... 726/3; 709/225
(58) Field of Classification Search ................ None
See application file for complete search history.

(56) References Cited

U.S. PATENT DOCUMENTS

| 5,101,374 A | 3/1992 | Sinutko, Jr. |
| 6,009,474 A | 12/1999 | Lu et al. ............... 709/245 |
| 6,128,298 A | 10/2000 | Wootton et al. ........... 370/392 |
| 6,249,820 B1 | 6/2001 | Dobbins et al. ........... 709/238 |
| 6,337,782 B1 * | 1/2002 | Guerin et al. ............ 360/256.1 |
| 6,502,135 B1 * | 12/2002 | Munger et al. ............ 709/225 |
| 7,016,964 B1 * | 3/2006 | Still et al. ............... 709/229 |
| 2002/0161925 A1 * | 10/2002 | Munger et al. ............ 709/241 |

OTHER PUBLICATIONS

Internet Snoop Deceiver, *IBM Research Disclosure*, No. 428, Art. 117, p. 1682 (Dec. 1999).

* cited by examiner

*Primary Examiner*—Gilberto Barrón, Jr.
*Assistant Examiner*—Virgil Herring
(74) *Attorney, Agent, or Firm*—Akerman Senterfitt

(57) ABSTRACT

A server (115) having a communication link comprises an application execution environment, a random IP address generator application (135) executing within the application execution environment of the server to randomly select (205) an IP address, a communications interface configured to send outbound data or to receive inbound data thereby establishing the communications link in coordination with the random IP address generator application and a processor (150). Preferably, the processor is programmed to receive a request from a client (112 or 114) and process the request if an IP address randomly selected at the client synchronously matches the randomly selected IP address at the server. Additionally, the processor can be further programmed to ignore the request from the client if the IP address randomly selected at the client fails to synchronously match the randomly selected IP address at the server.

18 Claims, 1 Drawing Sheet

SECURE COMMUNICATION OVERLAY USING IP ADDRESS HOPPING

BACKGROUND OF THE INVENTION

1. Technical Field

This invention relates to the field of telecommunications and, more particularly, to a security overlay scheme using internet protocol (IP) address hopping.

2. Description of the Related Art

Wireless transmissions are easier to intercept than transmissions over wired networks. The 802.11 standard currently specifies the Wireless Equipment Privacy (WEP) security protocol to provide encrypted communication between a client and an access point (AP). WEP employs the symmetric key encryption algorithm, Ron's Code 4 Pseudo Random Number Generator (RC4 PRNG).

Under WEP, all clients and APs on a wireless network use the same key to encrypt and decrypt data. The key resides in the client computer and in each AP on the network. The 802.11 standard does not specify a key management protocol, so all WEP keys on a network must be managed manually. Support for WEP is standard on most current 802.11 cards and APs. WEP security is not available in ad hoc (or peer-to-peer) 802.11 networks that do not use APs. WEP specifies the use of a 40-bit encryption key and there are also implementations of 104-bit keys. The encryption key is concatenated with a 24-bit "initialization vector," resulting in a 64- or 128-bit key. This key is input into a pseudorandom number generator. The resulting sequence is used to encrypt the data to be transmitted. The problem with this is that it is still possible for a user to intercept the key and then decrypt the transmissions on the 802.11 network.

Several U.S. Patents discuss the use of multiple IP addresses, but for different purposes or for similar purposes in quite a different manner. U.S. Pat. No. 6,128,298 entitled "Internet Protocol Filter" describes a technique to separate the public Internet IP addresses from a private intranet by using a single IP address to the Internet and a plurality of ports on the intranet to solve the problem of IP address conservation. It does not describe a schema where the IP address is hopping using a shared secret to secure transactions on a wireless network.

U.S. Pat. No. 6,009,474 entitled "Method and Apparatus for Re-assigning Network Addresses to Network Servers by Re-configuring a Client Host Connected ThereTo" discusses a method and apparatus for re-assigning IP addresses to a group of servers by re-configuring a client host coupled to those client servers.

U.S. Pat. No. 5,101,374 entitled "Secure Fast Storage Retrieval without Interactive Checking" describes a technique for secure retrieval of information from a storage device.

U.S. Pat. No. 6,249,820 B1 entitled "Internet Protocol IP Work Group Routing" describes a method and apparatus where multiple router interfaces are assigned the same IP network address creating an IP work group. None of the references listed above describe a schema where the IP address is hopping using a shared secret to secure transactions on a wireless network or a wired network.

Publication RD-428117 describes a technique for using different IP addresses to avoid a security risk due to snooping. This technique describes how a VPN can send bogus data to multiple alternate IP addresses and send good data to the valid IP address. Thus, someone snooping, would not be able to determine which IP address contained the valid data. Publication RDN428 similarly describes a technique for using different IP addresses to avoid a security risk due to snooping. This technique describes how a VPN can send bogus data to multiple alternate IP addresses and send good data to the valid IP address. Thus, someone snooping, would not be able to determine which IP address contained the valid data. None of the publications listed above describe a schema where the IP address is hopping using a shared secret to secure transactions on a wireless or a wired network.

Thus, a need exists for providing added security on communication links that may already provide some form of security by the transfer of encrypted data. Although there may exist several systems using multiple IP addresses, none of the existing systems utilize a hopping IP address to secure and inherently authenticate data transactions across communication links.

SUMMARY OF THE INVENTION

As mentioned above, a method and apparatus in accordance with the present invention generally utilizes a schema where the IP address hops using a shared secret to secure transactions on a wireless or a wired network. In a first aspect of the present invention, a method of providing a communications security overlay comprises the steps at a client and a server respectively of generating a synchronized random number for randomly selecting an IP address at the client and the server respectively. The client can send a request to the server using an IP address generated with the synchronized random number and the server can receive the request and process the request if the IP address matches an IP address generated with the synchronized random number at the server. If the IP addresses do not match in a synchronous fashion, the server can ignore the request. Further, the server can track for multiple clients generating the same IP address which can happen inadvertently in such a system. If the same IP address is used by more than one client, then the server can wait for another IP address generated with the synchronized random number. Preferably, the IP addresses generated with the synchronized random number at both the client and the server changes at a pre-determined interval.

In a second aspect of the present invention, a server having a communication link comprises an application execution environment, a random IP address generator application executing within the application execution environment of the server to randomly select an IP address, a communications interface configured to send outbound data or to receive inbound data thereby establishing the communications link in coordination with the random IP address generator application and a processor. Preferably, the processor is programmed to receive a request from a client and process the request if an IP address randomly selected at the client synchronously matches the randomly selected IP address at the server. Additionally, the processor can be further programmed to ignore the request from the client if the IP address randomly selected at the client fails to synchronously match the randomly selected IP address at the server. The server can operate as an access point for a wirelessly connected client. The client can couple to the server via any number of telecommunications links such as a wired local area network, a wireless local area network, a point-to-point connection using a dial-up modem, a point-to-point connection over Ethernet for DSL, and a data over cable standard interface.

In a third aspect of the present invention, a client having a communication link comprises an application execution environment, a random IP address generator application executing within the application execution environment of the client to randomly select an IP address, a communications interface configured to send outbound data or to receive inbound data thereby establishing the communications link in coordination with the random IP address generator application, and a processor. Preferably, the processor can be programmed to send a request to a server and receive a response from the server if the IP address randomly selected at the client synchronously matches a randomly selected IP address at the server. The processor can be further programmed to select another randomly selected IP address to send to the server if no response is received. The client can couple to the server via any number of telecommunications links such as a wired local area network, a wireless local area network, a point-to-point connection using a dial-up modem, a point-to-point connection over Ethernet for DSL, and a data over cable standard interface.

In a fourth aspect of the present invention, a machine-readable storage having stored thereon a computer program having a plurality of code sections executable by a machine for causing the machine to perform the following steps: Randomly selecting an IP address at a server using a random number generator synchronized with a random number generator at a client, receiving a request from the client, and processing the request if the IP address at the client synchronously matches an IP address at the server. The request is otherwise ignored by the server. The machine-readable storage can also have code sections executable by the machine to track multiple clients generating the same IP address and to wait for another IP address generated with the synchronized random number at the client if the server detects multiple clients generating the same IP address. The machine-readable storage can also have code sections executable by the machine to change IP addresses generated with the synchronized random number generator at a predetermined interval.

In yet another aspect of the present invention, a machine-readable storage having a plurality of code sections executable by a machine can cause the machine to perform the steps of randomly selecting an IP address at a client using a random number generator synchronized with a random number generator at a server, sending a request to the server using the randomly selected IP address, and awaiting a response to the request from the server if the randomly selected IP address from the client matches a randomly selected IP address at the server. The machine-readable storage can also have code sections executable by the machine to send another randomly selected IP address if the client receives no response from the server.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
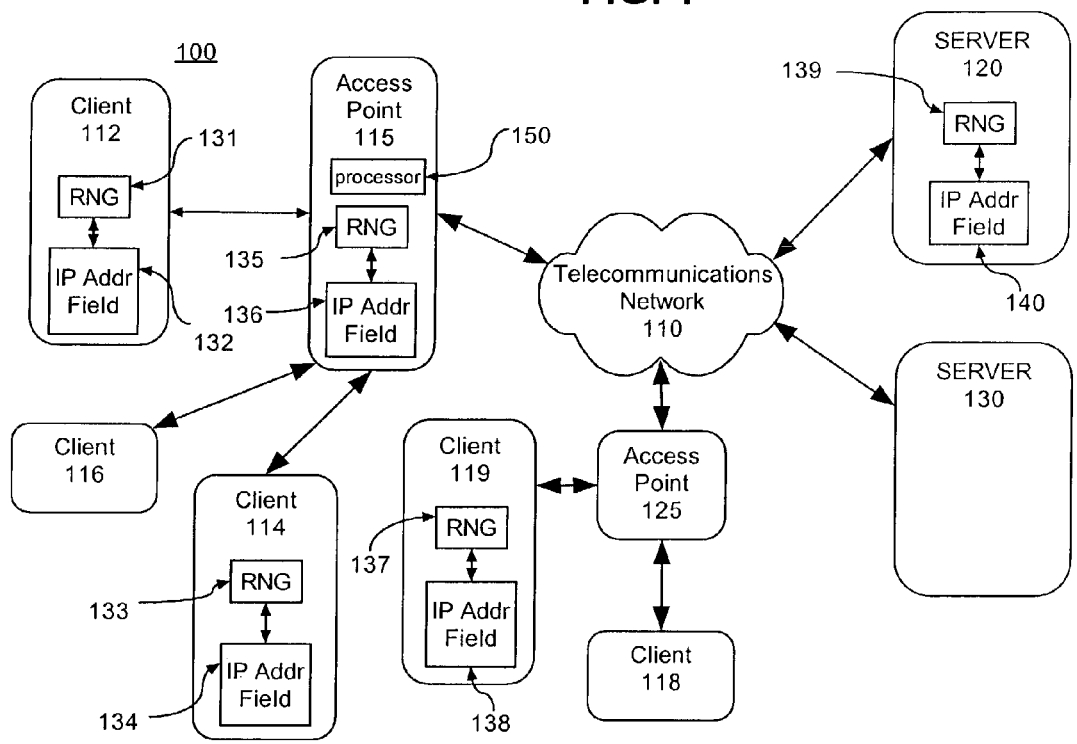
FIG. 1 is a schematic diagram illustrating an exemplary telecommunications using randomly selected IP addresses to establish a client/server link in accordance with the present invention.

FIG. 1 is a schematic diagram illustrating an exemplary telecommunications system 100 having a plurality of clients, servers and/or access points configured in accordance with the inventive arrangements disclosed herein. As shown the telecommunications system 100 can include a telecommunications network 110, a server 120, a server 130, access points or servers 115 and 125, and clients 112, 114, 116, 118, and 119. The telecommunications network 110 can be a public-switched telephone network, wireless networks, as well as any other communications networks capable of supporting data communications such as wired and wireless local area networks, point-to-point connections using a dial-up modem, point-to-point connections over Ethernet for DSL, and data over cable standard interface. The access points and/or servers can serve as an interface between the circuit-switched network or the packet-switched network environment of the telecommunications network 110.

In particular, the present invention can include a server or access point such as access point 115 having a communication link. The access point 115 preferably includes an application execution environment and a random IP address generator application executing within the application execution environment of the server. The random IP address generator application can comprise or utilize a random number generator 135 and an IP address field 136 that enables the access point 115 to randomly select an IP address. The access point 115 can further comprise a communications interface configured to send outbound data or to receive inbound data thereby establishing the communications link in coordination with the random IP address generator application and a processor 150 within the access point. Preferably, the processor is programmed to receive a request from a client 112 or 114 and process the request if an IP address randomly selected at the client 112 or 114 synchronously matches the randomly selected IP address at the server or access point 115. Additionally, the processor 150 can be further programmed to ignore the request from the client 112 and/or 114 if the IP address randomly selected at the client 112 and /or 114 fails to synchronously match the randomly selected IP address at the server or access point 115. Note that the clients 112 and 114 also have random number generators 131, 133 and IP address fields 132, 134 respectively. The server can operate as an access point for a wirelessly connected client. The client can couple to the server via any number of telecommunications links such as a wired local area network, a wireless local area network, a point-to-point connection using a dial-up modem, a point-to-point connection over Ethernet for DSL, and a data over cable standard interface.

The access point (or server) 115 will preferably track the IP addresses from the various clients. If two randomly generated addresses from two or more clients such as clients 112 and 114 are inadvertently the same at any point in time, then the access point 115 will ignore any request from such clients and wait until a subsequent request is received from either client having a unique IP address that synchronously matches the randomly selected IP address at the access point 115. If the system 100 also accepts data transfers from conventional clients such as client 116 (that does not use a randomly generated IP address, but a static address), then the access point 115 must also track such static addresses and make sure that IP addresses from other clients do not match this static address. The link between client 116 and access point 115 does not provide the added security found in the links between clients 112 or 114 and access point 115.

In another example shown in FIG. 1, the present invention can include a server 120 having a random number generator 139 and an IP address field 140 that enables the server 120 to randomly select an IP address. The server 120 can further comprise a communications interface configured to send outbound data or to receive inbound data (such as a cable, dial-up or DSL modem.) The server 120 can also include a processor (not shown) that is preferably programmed to receive a request from a client 119 and process the request if an IP address randomly selected at the client 119 synchronously matches the randomly selected IP address at the server 120. The client 119 can also have a random number generator 137 and an IP address field 138 (and processor (not shown)) that enables the random selection of an IP address hopefully synchronously matching the randomly selected address at the server 120. Additionally, the processor at the server 120 can be further programmed to ignore the request from the client 119 if the IP address randomly selected at the client 119 fails to synchronously match the randomly selected IP address at the server 120. Note that the client 119 can communicate (either wirelessly or in a wired connection) with an access point 125 which in turn couples to the server 120 via the telecommunications network 110.

A system 100 in accordance with the present invention can include other clients (118) and servers (130) that do not have a secure overlay including the randomly generated IP addresses, but such links between such clients and servers will not be as secure as the links utilizing the randomly generated IP addresses. For example, the links between client 118 and access point 125 as well as between client 118 and server 120 (or server 130) will lack the overlay protection of the synchronous randomly selected IP addresses, whereas the link between client 119 and server 120 will include the secure overlay of the present invention using randomly selected IP addresses. The link between client 119 and access point 125 does not have this protection, but can be an otherwise secure link. For example, an access point can be an internal modem within the client 119. A previously explained, the client can couple to the server via any number of telecommunications links such as a wired local area network, a wireless local area network, a point-to-point connection using a dial-up modem, a point-to-point connection over Ethernet for DSL, and a data over cable standard interface.

The present invention uses a technique that can overlay existing security techniques (such as data encryption) to provide an added layer of security to a wireless network or other communication links. In short, an IP address of a client is constantly changing in a known pseudo-random algorithm with an access point or server. By constantly changing the IP address of the client, an additional layer of security is enabled on all transactions. Even if someone were to identify a key to decrypt transactions using encryption, they would not be able to represent themselves as a client nor would they be able to follow the transactions as they would not know the sequence of IP addresses since the sequence would be a shared secret between the client and server. In addition, since 802.11 can operate on a corporate Intranet, a client would have the full 32 bits (or larger size as applicable) of IP address available to utilize in the random selection of an IP address.

Figure 2:
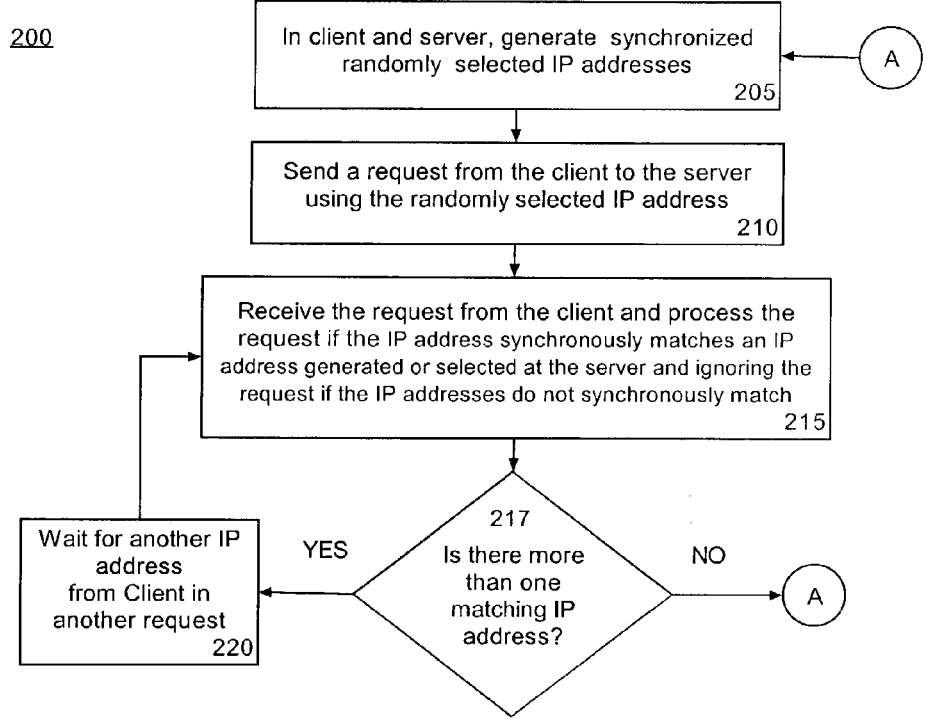
FIG. 2 is a flow chart illustrating a method according to the present invention.

Referring to FIG. 2, a flow chart illustrating a method 200 in accordance with the present invention is shown. Generally, the method 200 utilizes a schema where the IP address hops using a shared secret to secure transactions on a wireless or a wired network to provide a communications security overlay. The method 200 preferably comprises the step 205 at a client and a server respectively of generating a synchronized random number for randomly selecting an IP address at the client and the server respectively. The client at step 210 can send a request to the server using an IP address generated with the synchronized random number. At step 215, the server can receive the request and process the request if the IP address matches an IP address generated with the synchronized random number at the server. If the IP addresses do not match in a synchronous fashion, the server can ignore the request. Further, the server at decision block 217 can track for multiple clients generating the same IP address which can happen inadvertently in such a system. If the same IP address is used by more than one client, then the server can wait for another IP address at step 220 generated with the synchronized random number. Preferably, the IP addresses generated with the synchronized random number at both the client and the server changes at a pre-determined interval.

In an actual implementation and operationally, both the client and the server would preferably have synchronized random number generators. The random number generator could be the Secure ID provided by RSA or a similar system. The random number generators are used by the client and server to randomly select an IP address from a 32 bit IP address field for example. If the client was to make a request to the server, the client would determine its IP address and make a TCP/IP request of the server. The server would compare the request from the client to the server's generated random number IP addresses and make sure it matches what was presented by the client. If the IP address matches, the server continues processing the request. If it does not match, the server ignores the request. The client and server will continuously change the IP address. The IP address will change preferably based upon a pre-set latency agreed to as part of setting up the client/server link.

As explained above, it is possible with multiple clients to have two clients simultaneously generate the same IP address request. The server, which tracks all clients, would need to be aware if two clients generate the same IP address. If two clients generate the same IP address, the server will ignore all requests from that IP address until a new random IP address is created that does not conflict.

The invention can allow existing WEP security protocols to operate over the network unmodified. The techniques disclosed herein can serve as an IP address hopping overlay on top of the 802.11 protocol. In this way, even if a user was able to decrypt a WEP session, they would not be able to masquerade as a client as they would not be able to establish a session with the server.

Those skilled in the art should appreciate that the present invention can be used in any of a variety of different application environments, platforms, and formats. Also, the present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing a communications security overlay, comprising the steps of:
   synchronizing generation of random numbers in a client and a server for generating a synchronized random number;
   generating an IP address for the client at the client using the synchronized random number;
   generating the IP address for the client at the server using the synchronized random number;
   sending a request from the client to the server from the IP address of the client that is generated with the synchronized random number;
   at the server, receiving the request from the client and processing the request if the IP address of the client matches the IP address generated with the synchronized random number at the server and ignoring the request otherwise;
   at a server, tracking for multiple clients generating the same IP address; and
   waiting at the server for another IP address generated with the synchronized random number if multiple clients generate the same IP address.

2. The method of claim 1, wherein the IP address generated with the synchronized random number changes at a pre-determined interval when establishing a client server link.

3. A method of providing a communications security overlay, comprising the steps at a server of:
   synchronizing a generation of a random number for a client and a server;
   randomly selecting an IP address using the random number that is synchronized with a random number generated at the client;
   receiving at the server a request from the client using the randomly selected IP address generated by the client with the synchronized random number;
   processing the request if the IP address generated by the client matches an IP address generated with the synchronized random number at the server and ignoring the request otherwise;
   tracking multiple clients generating the same IP address; and
   waiting for another IP address generated with the synchronized random number if multiple clients generate the same IP address.

4. The method of claim 3, wherein the IP address generated with the synchronized random number changes at a pre-determined interval when establishing a client server link.

5. A method of providing a communications security overlay, comprising the steps at a client of:
   synchronizing a generation of a random number for a client and a server;
   randomly selecting an IP address using the random number that is synchronized with a random number generated at the server;
   sending a request to the server using the randomly selected IP address generated by the client with the synchronized random number; and
   awaiting a response to the request from the server if the IP address generated by the client matches an IP address generated by the server with the synchronized random number,
   wherein the server tracks multiple clients generating the same IP address and waits for another IP address generated with the synchronized random number if multiple clients generate the same IP address.

6. The method of claim 5, wherein the step of awaiting a response comprises receiving no response from the server if the IP address fails to match the IP generated with the synchronized random number at the server.

7. A server having a communication link, said server comprising:
   an application execution environment for synchronizing a generation of a random number at a client and the server;
   a random IP address generator application executing within the application execution environment of the server to randomly select an IP address based on the random number;
   a communications interface configured to send outbound data or to receive inbound data thereby establishing the communications link in coordination with the random IP address generator application;
   a processor programmed to:
      receive a request from a client; and
      process the request if an IP address randomly selected at the client synchronously matches the randomly selected IP address at the server,
   wherein the server tracks multiple clients generating the same IP address and waits for another IP address generated with the synchronized random number if multiple clients generate the same IP address.

8. The server of claim 7, wherein the processor is further programmed to ignore the request from the client if the IP address randomly selected at the client fails to synchronously match the randomly selected IP address at the server.

9. The server of claim 7, wherein said server serves as an access point for a wirelessly connected client.

10. The server of claim 7, wherein the client couples to the server via a telecommunications link selected from the group comprising a wired local area network, a wireless local area network, a point-to-point connection using a dial-up modem, a point-to-point connection over Ethernet for DSL, and a data over cable standard interface.

11. A client having a communication link, said client comprising:
   an application execution environment for synchronizing a generation of a random number at a client and a server;
   a random IP address generator application executing within the application execution environment of the client to randomly select an IP address based on the random number;
   a communications interface configured to send outbound data or to receive inbound data thereby establishing the communications link in coordination with the random IP address generator application; and a processor programmed to:
    send a request to a server; and
    receive a response from the server if the IP address randomly selected at the client synchronously matches a randomly selected IP address at the server, wherein the server tracks multiple clients generating the same IP address and waits for another IP address generated with the synchronized random number if multiple clients generate the same IP address.

12. The client of claim 11, wherein the processor is further programmed to select another randomly selected IP address to send to the server if no response is received to the request.

13. The server of claim 11, wherein the client couples to the server via a telecommunications link selected from the group comprising a wired local area network, a wireless local area network, a point-to-point connection using a dial-up modem, a point-to-point connection over Ethernet for DSL, and a data over cable standard interface.

14. A machine-readable storage, having stored thereon a computer program having a plurality of code sections executable by a machine for causing the machine to perform the steps of:
    synchronizing a generation of a random number at a client and a server;
    randomly selecting an IP address at the server using a random number synchronized with a random number generated at the client;
    receiving a request from the client;
    processing the request if the IP address at the client synchronously matches an IP address at the server and ignoring the request otherwise;
    tracking multiple clients generating the same IP address; and
    waiting for another IP address generated with the synchronized random number at the client if the server detects multiple clients generating the same IP address.

15. The machine-readable storage of claim 14, wherein the machine-readable storage is further programmed to track multiple clients generating the same IP address.

16. The machine-readable storage of claim 14, wherein the IP address generated with the synchronized random number generator changes at a pre-determined interval when establishing a client server link.

17. A machine-readable storage, having stored thereon a computer program having a plurality of code sections executable by a machine for causing the machine to perform the steps of:
    synchronizing a generation of a random number at a client and a server;
    randomly selecting an IP address at the client using a random number synchronized with a random number generated at the server;
    sending a request to the server using the randomly selected IP address;
    awaiting a response to the request from the server if the randomly selected IP address from the client matches a randomly selected IP address at the server; and
    at a server, tracking for multiple clients generating the same IP address; and
    waiting at the server for another IP address generated with the synchronized random number if multiple clients generate the same IP address.

18. The machine-readable storage of claim 17, wherein the machine-readable storage has a plurality of code sections executable by the machine for causing the machine to send another randomly selected IP address if the client receives no response from the server.

* * * * *